United States Patent
Venable

(10) Patent No.: US 6,704,456 B1
(45) Date of Patent: Mar. 9, 2004

(54) AUTOMATIC IMAGE SEGMENTATION IN THE PRESENCE OF SEVERE BACKGROUND BLEEDING

(75) Inventor: Dennis L. Venable, Marion, NY (US)

(73) Assignee: Xerox Corporation, Stamford, CT (US)

(*) Notice: Subject to any disclaimer, the term of this patent is extended or adjusted under 35 U.S.C. 154(b) by 0 days.

(21) Appl. No.: 09/389,112

(22) Filed: Sep. 2, 1999

(51) Int. Cl.⁷ .................................................. G06K 9/00
(52) U.S. Cl. ........................................ 382/266; 382/286
(58) Field of Search ................................ 382/256–269, 382/199–200, 151, 286

(56) References Cited

U.S. PATENT DOCUMENTS

| | | | |
|---|---|---|---|
| 4,922,543 A | 5/1990 | Hugo et al. .................... 382/48 |
| 5,220,398 A | 6/1993 | Horn et al. ................... 356/152 |
| 5,253,765 A | 10/1993 | Moorehead et al. ........ 209/539 |
| 5,313,570 A | 5/1994 | Dermer et al. .............. 395/131 |
| 5,418,574 A | 5/1995 | Miyabata et al. ........... 348/625 |
| 5,485,568 A | 1/1996 | Venable et al. ............. 395/155 |
| 5,528,387 A | 6/1996 | Kelly et al. .................. 358/488 |
| 5,974,169 A | 10/1999 | Bachelder .................... 382/151 |
| 6,088,473 A * | 7/2000 | Xu et al. ...................... 382/132 |
| 6,240,208 B1 * | 5/2001 | Garakani et al. ........... 382/190 |
| 6,360,021 B1 * | 3/2002 | McCarthy et al. .......... 382/254 |

OTHER PUBLICATIONS

1996 IEEE Proceedings of ICPR 96' PP508–512 Voss et al, Invariant Fitting of Planar Objective by Primitives.
1995 Proceedings vol. 1, Technical Association of the Graphic Arts.

* cited by examiner

Primary Examiner—Thomas D. Lee
Assistant Examiner—Stephen Brinich
(74) Attorney, Agent, or Firm—Aditya Krishnan; Christopher D. Wait

(57) ABSTRACT

A method and apparatus for processing a digital image using an imaging input device so as to reduce bleeding of the edges of the detected images comprising receiving a digitized image including at least one of a plurality of representations of objects, and processing the digitized image into at least one of a plurality of images of the digitized image. The processing step includes defining a plurality of bins having a plurality of edge points making up each of the plurality of images of the digitized image.

28 Claims, 14 Drawing Sheets

AUTOMATIC IMAGE SEGMENTATION IN THE PRESENCE OF SEVERE BACKGROUND BLEEDING

This invention relates generally to detection of a particular images of several documents placed on the platen of an image input device in the presence of severe background bleeding, and more particularly to the automatic detection and segmentation of the series of images placed on the platen using the technologies of joining orphaned images, linear regression algorithms and collinearity detectors.

Cross reference is made to the following related applications are hereby incorporated by reference for their teachings:

"METHOD AND APPARATUS FOR IDENTIFYING A PLURALITY OF SUB-IMAGES IN AN INPUT IMAGE," Dennis L. Venable et al., application Ser. No. 08/786,538, filed Jan. $21^{st}$, 1997;

"STRUCTURED IMAGE (SI) EDITOR AND METHOD FOR is EDITING STRUCTURED IMAGES," Michael R. Campanelli et al., application Ser. No. 08/338,856, filed Nov. 14, 1994; and "LOCATING THE POSITION AND ORIENTATION OF MULTIPLE OBJECTS WITH A SMART PLATEN," Dennis L. Venable., application Ser. No. 08/785,109, filed Jan. $21^{st}$, 1997.

"DETECTING OVERLAPPING IMAGES IN AN AUTOMATIC IMAGE SEGMENTATION DEVICE WITH THE PRESENCE OF SEVERE BLEEDING," Dennis L. Venable, application Ser. No. 09/412212, filed September, 1999.

BACKGROUND AND SUMMARY OF THE INVENTION

To improve the ease of use of scanning systems, in particular digital copiers and scanners, it is desirable to automatically detect and segment scanned objects (e.g., a hard copy document) on the platen of the input scanner. To facilitate this automated detection and segmentation, it is necessary to identify the position, shape and rotation angle of the object. Such a capability can enhance productivity by decreasing the time required for scanning documents, enable multiple images to be efficiently scanned and reduce the requirement for accurate presentation placed upon document feeding mechanisms.

The present invention is directed to a system intended to automatically determine the boundaries of multiple objects within a scanned image of a series of documents. The present invention combines a number of graphics and image processing techniques into an automated, system that provides productivity enhancement for digital copiers and scanning systems.

The present invention accomplishes these objectives by: 1) locating each of the objects within an input image; 2) modeling the shape of the identified object (e.g., rectangle); and 3) positioning the object in a digital image at a predefined locations.

Heretofore, a number of patents and publications have disclosed segmentation and detection, the relevant portions of which may be briefly summarized as follows:

U.S. Pat. No. 5,485,568 to Venable et al., issued Jan. 16, 1996, and hereby incorporated by reference, discloses a method and apparatus for representing a complex color raster image as a collection of objects in a structured image format—a hierarchical, device-independent format. A structured image document, generated using the techniques described by Venable, is a representation of data that may be rendered into a raster image. The data includes simple raster images as well as a hierarchical collection of sub-objects and raster processing operations. The possible data types for objects in the structured image include a raster image, text, graphics, image processing description, and files containing multiple image representations U.S. Pat. No. 5,528,387 to Kelly et al., issued Jun. 18, 1996, teaches electronic image registration in a scanner. In particular, the edge data of a document is detected and skew angle calculated. The image is then rotated based upon the skew angle and non-image areas are filled using an image generation feature.

U.S. Pat. No. 4,922,350 to Rombola et al., issued May 1, 1990, discloses a two-pass scanning apparatus for detecting the size and position of an original document on a scanner platen. Image signals captured on a first scan are employed to determine boundaries and a best-fit magnification so that the image may be fit to a recording sheet using image signals generated on a subsequent scanning pass.

U.S. Pat. No. 5,253,765 to Moorehead et al, issued Oct. 19, 1993, teaches a system for sorting randomly sized objects (e.g., mushrooms). Invariant moments are employed, utilizing the complete pixel information for all pixels within the border of a captured image, to extract information about the mushroom size and orientation.

U.S. Pat. No. 5,220,398 to Horn et al. teaches an analog VLSI microchip that uses moments to determine the position and orientation of an object in a scene.

In "Invariant Fitting of Planar Objects by Primitives," published in 1996 *IEEE Proceedings of ICPR '96*, pp. 508–512 Voss et al. teach a method of pattern recognition using primitives such as triangles, rectangles, circles ellipses, super-quadratics, etc. The authors further describe a technique for describing the primitives using moments in a normalized manner; resulting in a decrease in the numerical effort.

In "MANAGING AND REPRESENTING IMAGE WORKFLOW IN PREPRESS APPLICATIONS", *Technical Association of the Graphic Arts (TAGA)* Vol. 1, 1995 Proceedings pp. 373–385, hereby incorporated by reference for its teachings, Venable et al. teach the use of structured images to manage workflow.

In accordance with the present invention, there is provided a method for processing a digital image using an imaging input device so as to reduce bleeding of the edges of the detected images comprising receiving a digitized image including at least one of a plurality of representations of objects; and processing said digitized image into at least one of a plurality of images of said digitized image wherein said processing step includes defining a plurality of bins having a plurality of edge points making up each of said plurality of images of said digitized image.

Further, in accordance with the present invention there is provided a method for processing a digital image using an imaging input device reducing bleeding of the edges of the detected images by determining edge contours to generate bounding boxes comprising: identifying bins having edges that approximate 90 degrees, and modeling a rectangular image fitting for bins that approximate the 90 degrees edges.

Further, in accordance with the present invention there is provided a method for processing a digital image comprising the steps of: receiving a digitized image of a plurality of representations of objects; and processing said digitized image into a plurality of images representing said digitized image wherein said processing step includes generating a plurality of bins wherein said bins have a plurality of edge points making up the boundaries of each of said plurality of images of said digitized image.

Finally, in accordance with the present invention there is provided a method for processing a digital image using an imaging input device reducing bleeding of the edges of the detected images by determining edge contours to generate bounding boxes comprising: identifying bins on said edge contours having edges that approximate 90 degrees, and modeling a rectangular image for each the identified bins.

The techniques described herein enable a user to expediently scan a document or other object, automatically recognizing the shape of the document within the digitized image, and composing a digital document incorporating the object.

The techniques described above are advantageous because they improve the efficiency of a scanning process, in the presence of severe bleeding.

Figure 1:
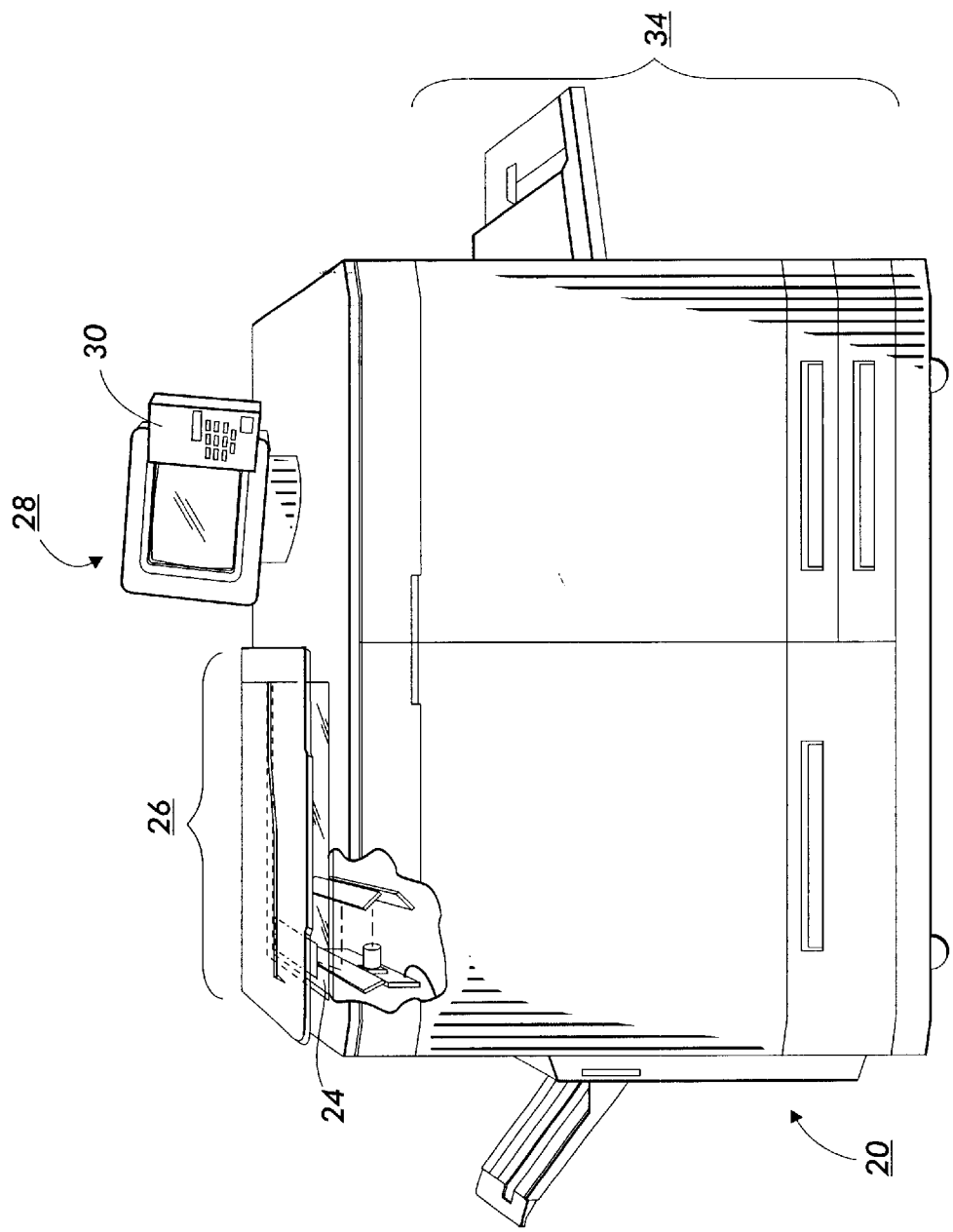
FIG. 1 is an illustration of an exemplary digital color printing system serving as an embodiment for the present invention.

The present invention will be described in connection with a preferred embodiment; however, it will be understood that there is no intent to limit the invention to the embodiments described. On the contrary, the intent is to cover all alternatives, modifications, and equivalents as may be included within the spirit and scope of the invention as defined by the appended claims.

DESCRIPTION OF THE PREFERRED EMBODIMENT

For a general understanding of the present invention, reference is made to the drawings. In the drawings, like reference numerals have been used throughout to designate identical elements. In describing the present invention, the following term(s) have been used in the description.

The term "data" refers herein to physical signals that indicate or include information. When an item of data can indicate one of a number of possible alternatives, the item of data has one of a number of "values." For example, a binary item of data, also referred to as a "bit," has one of two values, interchangeably referred to as "1" and "0" or "ON" and "OFF" or "high" and "low." A bit is an "inverse" of another bit if the two bits have different values. An N-bit item of data has one of 2N values. A "multi-bit" item of data is an item of data that includes more than one bit.

"Memory circuitry" or "memory" is any circuitry that can store data, and may include local and remote memory and input/output devices. Examples include semiconductor ROMs, RAMs, and storage medium access devices with data storage media that they can access. A "memory cell" is memory circuitry that can store a single unit of data, such as a bit or other n-array digit or an analog value.

A signal "indicates" or "selects" one of a set of alternatives if the signal causes the indicated one of the set of alternatives to occur. For example, a signal can indicate one bit set in a sequence of bit sets to be used in an operation, in which case the signal causes the indicated bit set to be used in the operation.

An image may include characters, words, and text as well as other features such as graphics. A text may be included in a set of one or more images, such as in images of the pages of a document. An image may be processed so as to identify specific within the image, each of which is an image.

A "bin" is a list of edge points that are approximately collinear. A list of edge points is converted into a sequence of bins that represent the boundaries as straight lines.

An object may be of any size and shape and has "physical attributes" or characteristics including, but not limited, to position, shape and orientation. For example, an object may be a document, when the document is placed on the platen of an image input device and the region of the platen is digitized to produce a representation thereof.

An item of data "defines" an image when the item of data includes sufficient information to produce the image. For example, a two-dimensional array can define all or any part of an image, with each item of data in the array providing a value indicating the color of a respective location of the image.

An item of data "defines" an image set when the item of data includes sufficient information to produce all the images in the set.

Each location in an image may be called a "pixel." In an array defining an image in which each item of data provides a value, each value indicating the color of a location may be called a "pixel value". Each pixel value is a bit in a "binary form" of an image, a gray scale value in a "gray scale form" of an image, or a set of color space coordinates in a "color coordinate form" of an image, the binary form, gray scale form, and color coordinate form each being a two-dimensional array defining an image.

An operation performs "image processing" when it operates on an item of data that relates to part of an image.

Pixels are "neighbors" or "neighboring" within an image when there are no other pixels between them and they meet an appropriate criterion for neighboring. If the pixels are rectangular and appear in rows and columns within a two-dimensional image, each pixel may have 4 or 8 neighboring pixels, depending on the criterion used.

An "edge" occurs in an image when two neighboring pixels have sufficiently different pixel values according to an appropriate criterion for the occurrence of an edge between them. The terms "edge pixel" or "boundary pixel" may be applied to one or both of two neighboring pixels between which an edge occurs.

An "image characteristic" or "characteristic" is a measurable attribute of an image. An operation can "measure" a characteristic by producing data indicating the characteristic using data defining an image. A characteristic is measured "for an image" if the characteristic is measured in a manner that is likely to produce approximately the same result each time it occurs.

A "version" of a first image is a second image produced using an item of data defining the first image. The second image may be identical to the first image, or it may be modified by loss of resolution, by changing the data defining the first image, or by other processes that results in modifying pixel values of the first image.

An "image input device" is a device that can receive an image and provide an item of data defining a version of the image. A "scanner" is an image input device that receives an image by a scanning operation, such as by scanning a document. A scanner may have a transparent surface (platen) or equivalent means to support a document during scanning. Other well-known image input devices include digital cameras, facsimile machines, and video recorders, or any image storage device having the capability to store data signals representative of the intensity of light reflected from the surface of objects at which the device is directed. A general purpose computer with an image creation program may also be an image input device.

An "image output device" is a device that can receive an item of data defining an image and provide or render the image as output. A "display" is an image output device that provides the output image in human viewable form, and a "printer" is an image output device that renders the output image in a human viewable, hard copy form.

Figure 2:
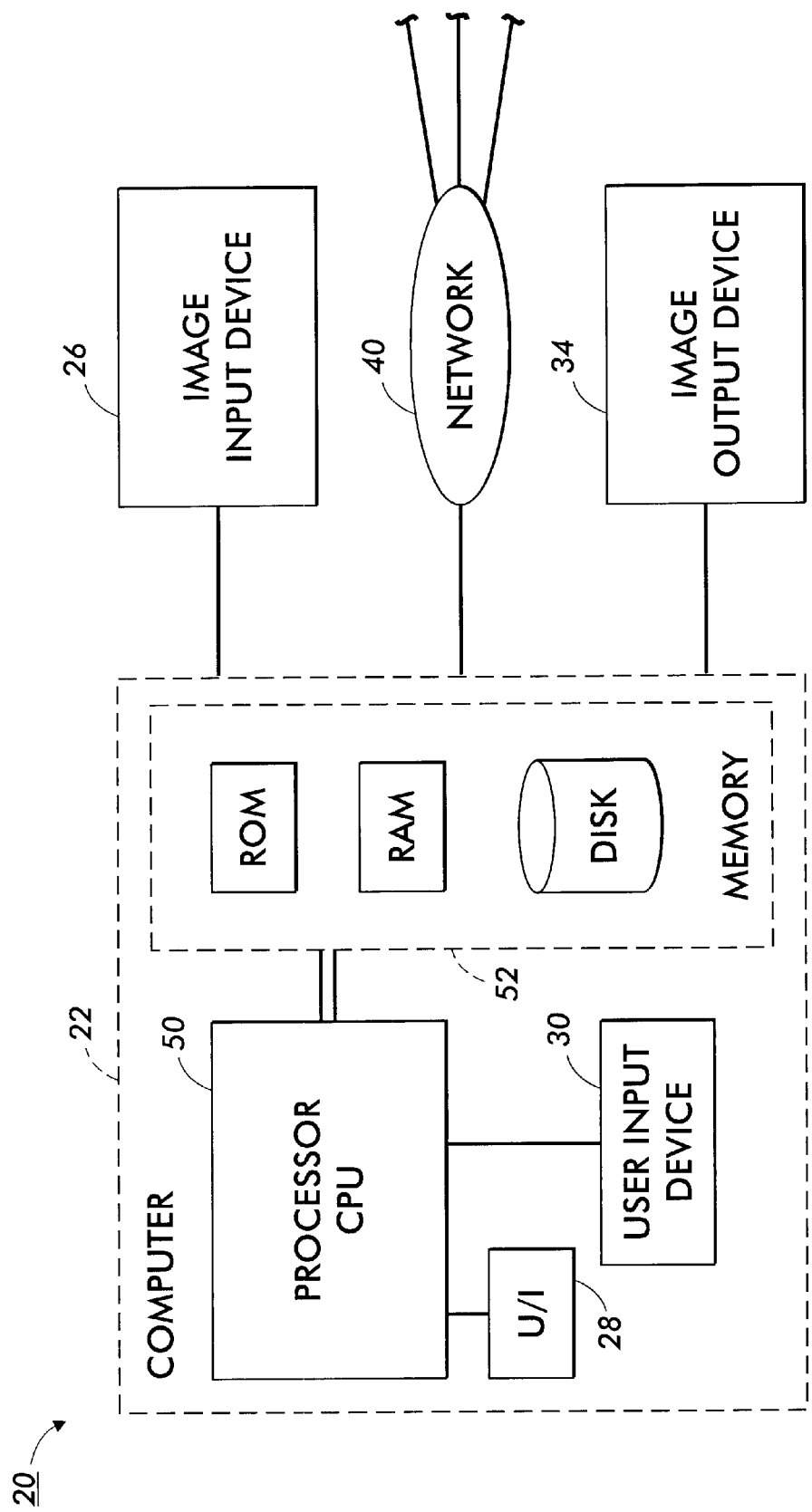
FIG. 2 is a block diagram of the various components comprising the system of FIG. 1.

Referring now to FIGS. 1 and 2, depicted therein is a digital printing system 20 in which the present invention finds particular use.

For example, system 20 may be a Xerox DocuColor® 40 Digital Color Printing System or the Xerox 5775® Digital Color Copier. System 20 includes a computer or data processing unit 22 (FIG. 2) capable of receiving digital data representing an image of an original document 24 placed upon a platen of scanner 26. Computer 22 initially stores the digital input data from scanner 26 in memory 52 (e.g., RAM or magnetic disk storage) where the image may subsequently be accessed. In addition to the digital data, memory 52 may also include program memory for the storage of object code suitable for directing the processor to execute image processing operations in accordance with the invention described herein. Computer 22 has associated therewith a user interface (U/I) 28 including one or more user input devices 30, such as a keyboard, a keypad, a mouse, trackball, stylus or equivalent pointing device, etc.

Figure 3:
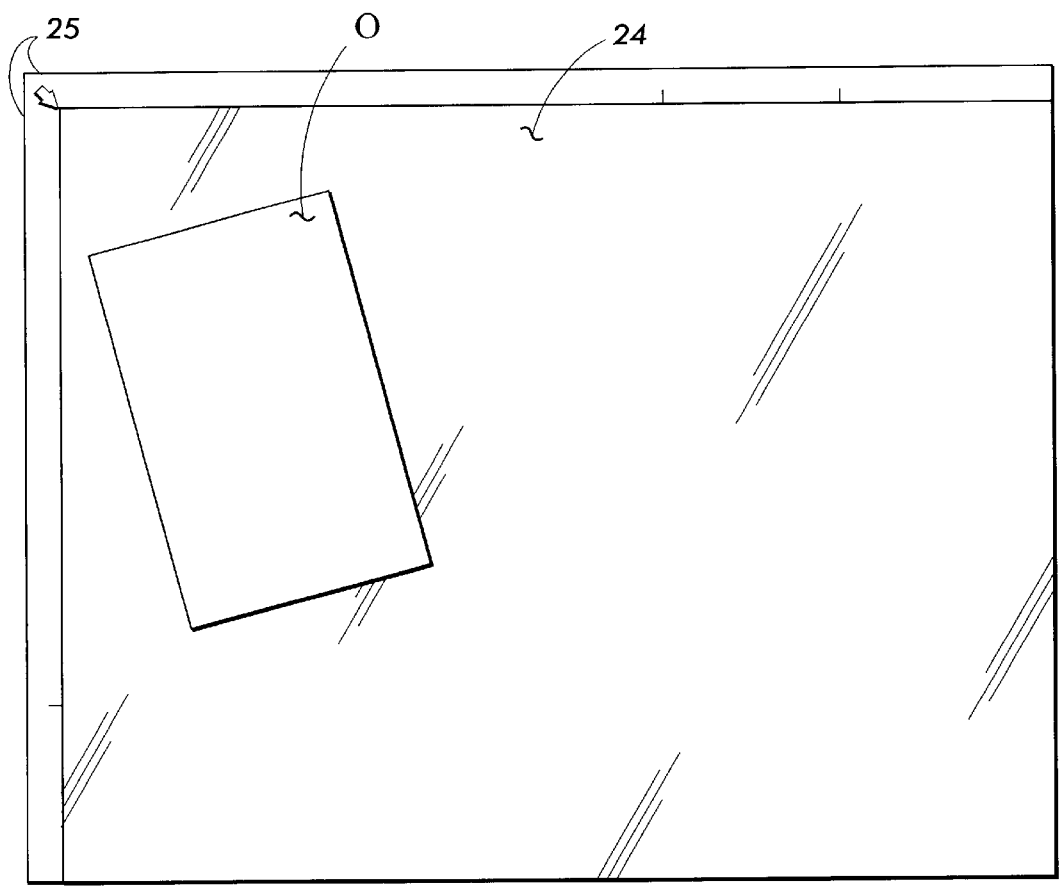
FIG. 3 is an illustration of the placement of a document object on a platen of the scanner depicted in FIG. 1.

Also part of system 20 is a color image output device such as printer 34 which may include a laser-driven, xerographic printing engine as found in a number of commercially available printers. In a preferred embodiment, system 20 is employed to process the digital image data received as input from a scanner 26, utilizing image processing software running in processor 50, so as to produce an output file that may be rendered by printer 34, stored in memory 50, and/or transmitted to another device via network 40. Although system 20 is depicted as an integrated unit in FIG. 1, it will be appreciated that the system may also comprise a plurality of independent yet interconnected units. Referring to FIG. 3, it will be appreciated that the document placed upon the scanner platen in system 20 may not be accurately registered along the registration edges 25. For example, a particular embodiment to which the following description will be directed is a single document object O placed in a central location on the platen of scanner 26 as illustrated in FIG. 3. In accordance with the present invention it is desired to automatically identify the position, shape and rotation angle of object O. In a facsimile transmission system using a set of rollers to advance a document through a scanning nip, it will be appreciated that the document may become skewed during the digitization process and that the present application may have particular application to such systems as well.

Figure 4:
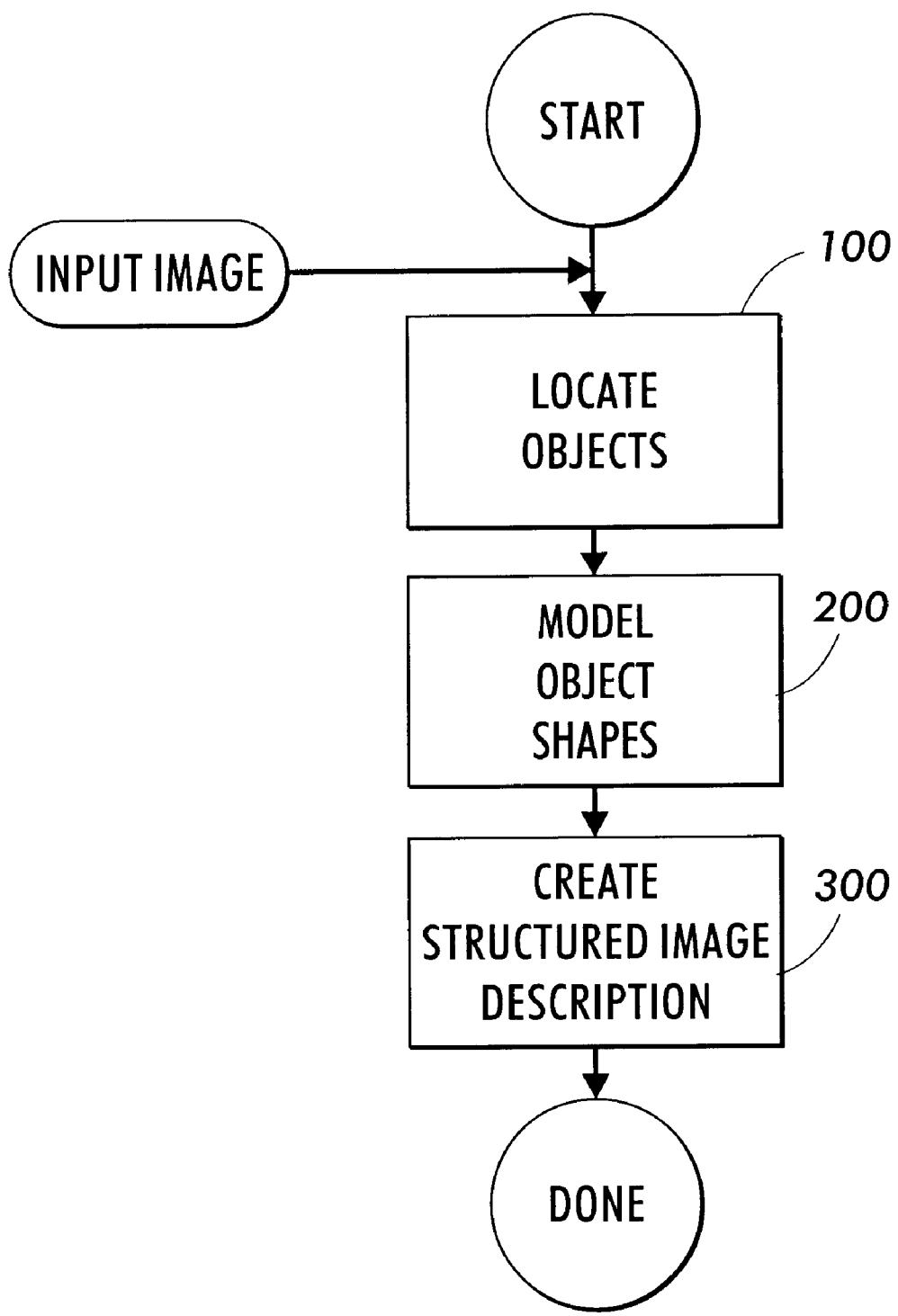
FIG. 4 is a flowchart illustrating the general processing steps carried out on the system of FIGS. 1 and 2 in accordance with the present invention.

Given an input image generated by scanning the scanner platen, the present invention automatically identifies at least the position, shape and orientation angle of the object. As shown in the flow chart of FIG. 4, the process carried out by computer 22 during the processing of the input image includes three general steps. First, at step 100 the object within the image is located and boundaries of the object are generally identified. Once the object is located, the shape of the object is modeled at step 200. Having located the object and modeled its shape, a structured image or similar digital document format representing the image and the object therein can be created as represented by step 300. The structured image preferably includes data representing not only the image data itself, but data representing the location, shape or orientation of the object, or some combination thereof. Alternatively, the output may be a page description language format or equivalents formats suitable for storing the image information in a retrievable form.

In an embodiment of the present invention, the scanned input image (or a lower resolution version thereof) is loaded into a memory frame buffer (RAM) where it is analyzed in accordance with the previously described steps. For purposes of the following detailed description, it is assumed that the object is distinguishable from the image background (e.g., the platen cover) and that the background of the image is contiguous. These simplifying assumptions are intended for purposes of explanation only and are not intended as limitations of the invention. One skilled in the art will appreciate that the invention described herein is extensible so as not to require operation only within the boundaries of such assumptions.

Figure 5:
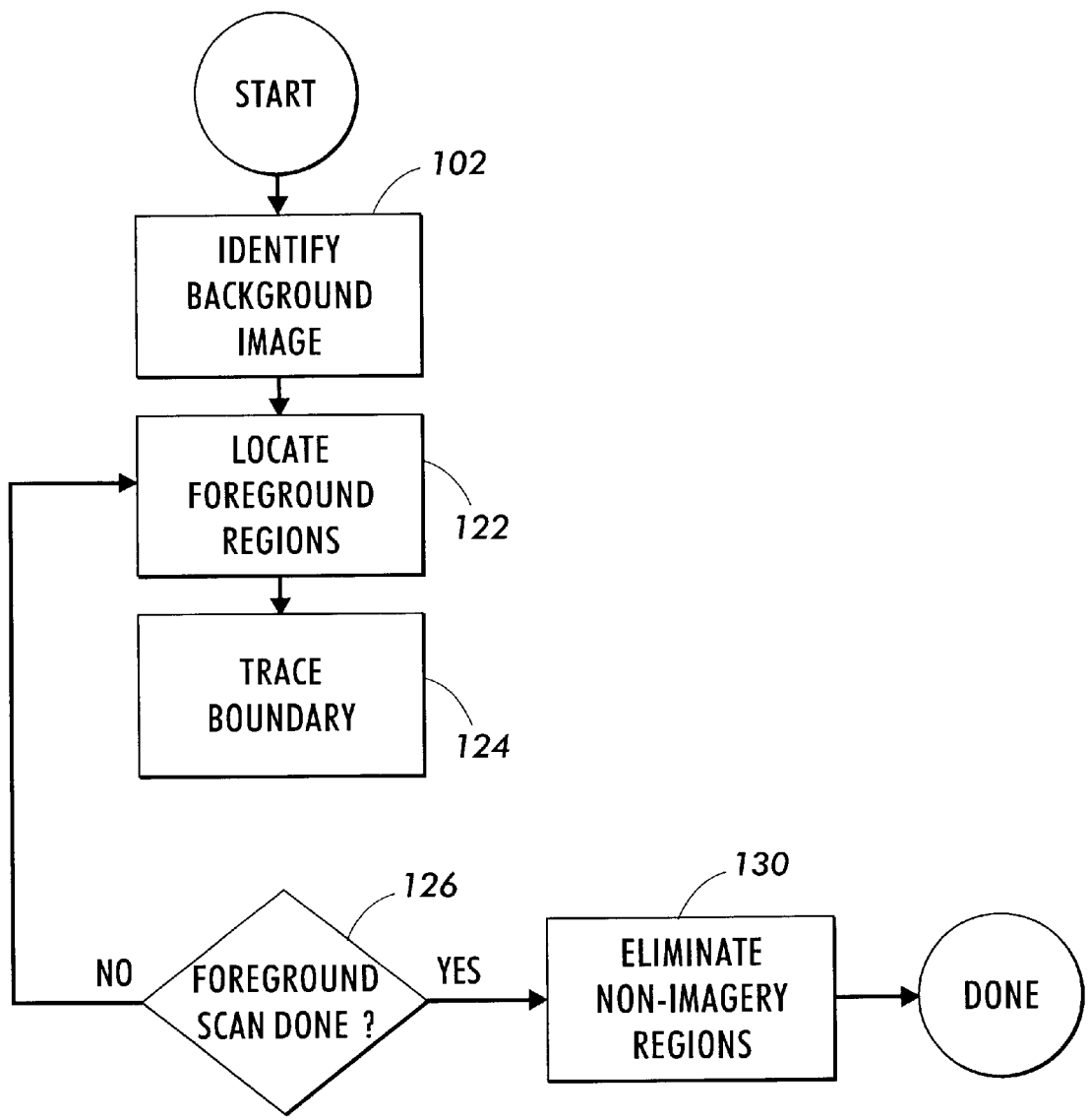
FIG. 5 is a detailed flowchart illustrating a series of processing steps carried out to initially determine the "seed" of the images.
Figure 6:
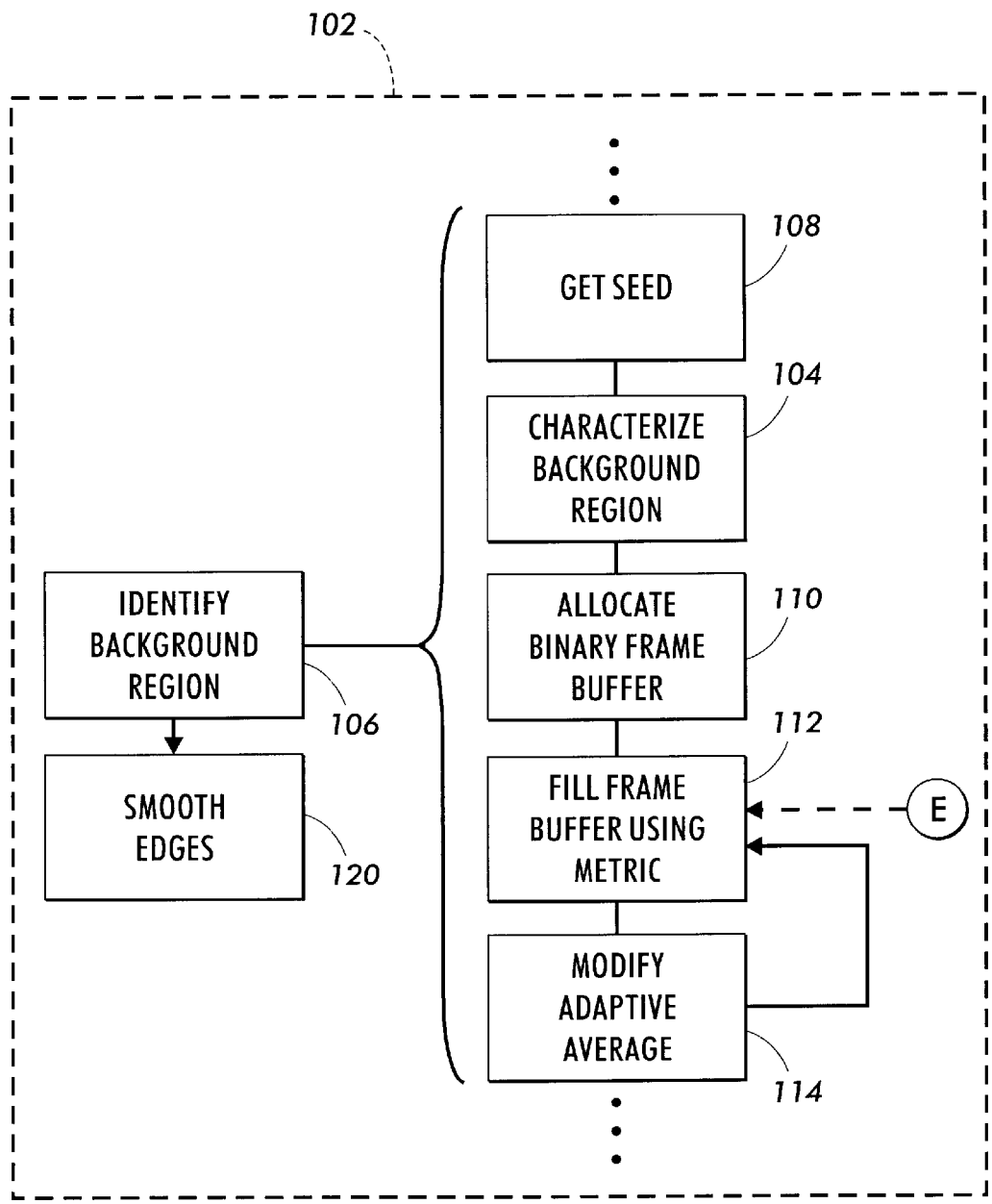
FIG. 6 is a more detailed flowchart showing the steps of determining the "seed" of the images.

As depicted by the flowcharts of FIGS. 5 and 6, the object location step 100 is performed by first identifying the background region of the input image 102, characterizing the background region 104, and then using the characteristic of the background region as a seed, identifying all the pixels representing the background region with an adaptive seed fill algorithm 106. Background pixels are pixels not associated with any objects, or more simply, they are pixels representative of those regions lying outside of the objects, the values of which are controlled by the "background" against which the objects are placed during scanning (e.g., the underside of the platen cover). One embodiment employs the average color of a small region in the upper left-hand corner of the scanned image as an initial estimate of the background color. Alternatively, other sampling operations may be employed to determine the background color as described, for example, in U.S. Pat. No. 5,282,061 for a Programmable Apparatus for Determining Document Background Level by Farrell.

Once the background color is characterized at step 104, an adaptive algorithm is preferably applied to monitor the background color and to accurately identify the objects. An example of a seed fill algorithm suitable for use in the present invention is described in *Graphics Gems I*, A. Glassner Ed., Academic Press, pp. 275–277, 1990, hereby incorporated by reference. An adaptive algorithm is required because the background pixels may have significant color variation resulting from a variation in illumination over the platen area. The adaptive seed fill algorithm is applied to the scanned color image data using an initial seed point characterized by the background, for example, the upper-left corner of the image. Generally, the adaptive seed fill algorithm fills a binary frame buffer with a mask indicating all contiguous pixels identified as background pixels. In a simple embodiment, represented by step 112, a pixel is considered to be a background pixel if its color falls within a small distance $\epsilon$ of the current average background pixel value. This distance is calculated as an Euclidean metric in red, green, blue (RGB) color space $$d = \text{SQRT}((P_r - \text{AdAvg}_r)^2 + (P_g - \text{AdAvg}_g)^2 + (P_b - \text{AdAvg}_b)^2),$$

where $P_k$, $\text{AdAvg}_k$ are, respectively, the RGB components of the pixel under test and the average background value, and d is the distance measurement. The value of $\epsilon$ is fixed and empirically determined in one embodiment. The test conducted at step 112 is:

if d<F, then pixel P is a background pixel, else pixel P is a foreground pixel.

The average background color is adaptively modified at step 114 by taking the average value of the last N pixels that have been classified as background. For efficiency, the system preferably calculates the adaptive average using the equation:

$$\text{AdAvg}' = (N * \text{AdAvg} - \text{AdAvg} + \text{LastVal})/N,$$

where AdAvg' is the modified average, AdAvg is the previous adaptive average, LastVal is the value of the last pixel identified as background, and N is the averaging window. Clearly, this is not a true running average, but it tracks the running average adequately and is more computationally efficient than a strict running average calculation. Alternatively, the value of $\epsilon$ can be adaptively modified. For example, $\epsilon$ might be based on the standard deviation of the last several pixels identified as background, etc.

It will be appreciated that alternative methods for the detection of background regions may be employed, and that the process of obtaining a binary map distinguishing the objects from the background may be accomplished using a simplified thresholding operation based upon the background color. In a preferred embodiment, the background color may be a function of the color of the platen cover, such as a white cover. As a further example, the digital color production system may employ a spectrally reflective or otherwise distinguishable platen cover that results in a background color that may be detected and distinguished from the objects.

Having identified background pixels and created a representation of the object boundaries, noisy edges can be optionally smoothed using, for example, morphological filtering. Subsequently, contiguous foreground regions are located, step 122, thereby identifying the objects. Scanning the background mask generated by the adaptive seed fill operation (step 106) identifies objects. Starting with the upper left hand pixel, the mask is searched in a scan line fashion for a pixel not classified in the mask as a background pixel—thus identifying pixels associated with a foreground object. The use of the seed fill algorithm for identifying the background assures that foreground objects are closed, or in other words, a complete boundary is formed about the perimeter of the object.

At step 124, tracing its edge identifies the boundary of an object. The boundary of the foreground object is traced using a simple 8-connected edge traversal operator which provides an ordered-set of points tracing the edge of the object. Such an edge traversal operation employs a contour tracing operation to generate a chain code in a manner similar to word or character based recognition systems. R. Bozinovic et al. in "Off-Line Cursive Script Word Recognition", IEEE Transactions describes an 8-connected process, for example, on *Pattern Analysis and Machine Intelligence*, Vol. 11, No. 1 (January 1989). In the situation of detecting multiple objects, one main object would preferably be selected using any of a number of techniques. For example, object selection could be accomplished by retaining the object with the largest perimeter or based upon the location of the object.

Once the object has been located, as described with respect to step 100, the next general step, step 200, is to model the shape of the object. For purposes of simplicity, the following description will treat rectangular-shaped objects, however, it will be appreciated that the description of the invention is extensible to other polygons and even to shapes having portions thereof represented by curves (e.g., circular or elliptical objects). The result or output from step 100 is a set of bounding pixels or a set of edge traces preferably organized in the form of a linked list. These pixels or traces can be used to extract the object, but orientation is not yet determined. To improve the quality of the object extraction, the object traces are fitted to a model shape. Orientation information and other characteristics of the object may then be extracted from the fitted parameters.

Figure 7:
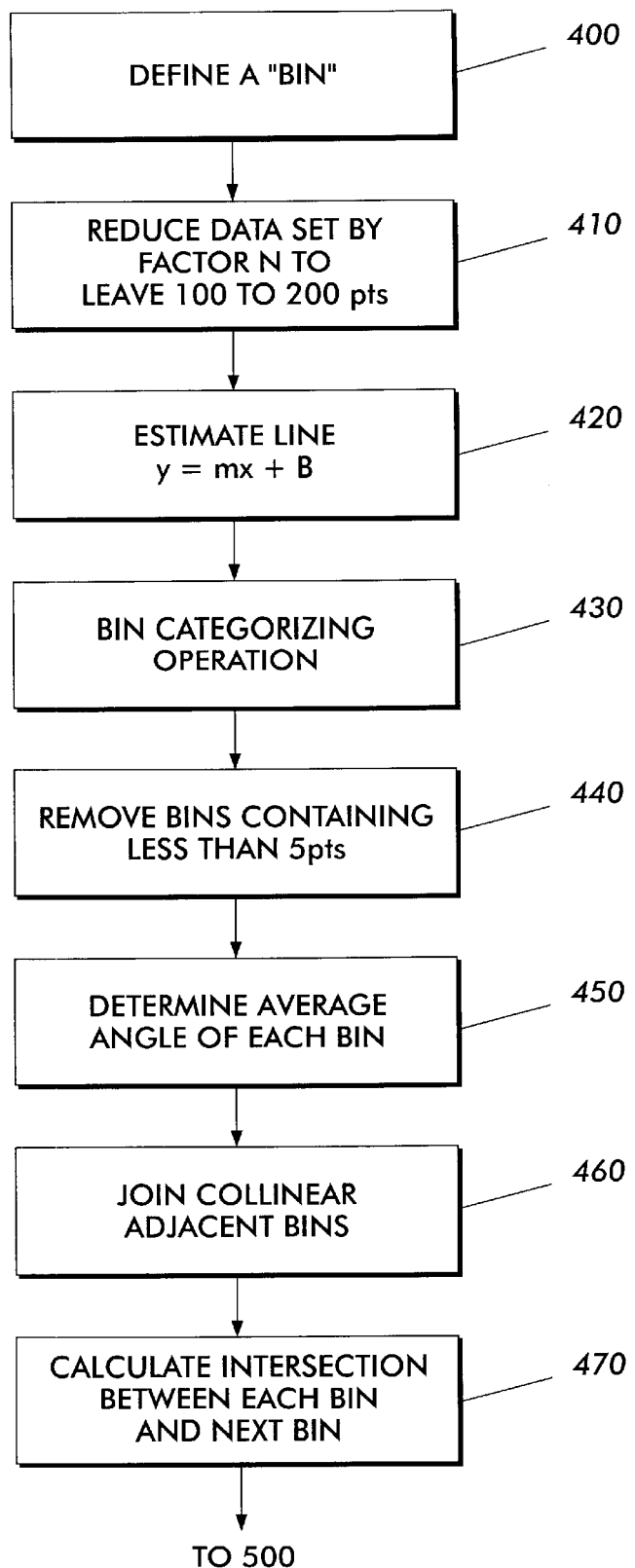
FIG. 7 is a detailed flow chart illustrating series of processing steps carried out in accordance with the present invention.

At step 400 of FIG. 7, the 'bin' or result of step 100 i.e. the step of bounding pixels or set of edge traces in the form of a linked list is defined. At step 410, a reduction of the data set is necessary. The linked list defined at step 400 may be too large; in fact, it may be in the order of 1,000 data points or more. Therefore, it is necessary to reduce the amount of data of these 1,000 or so data points. Using a factor N divisible into the total data points does such data reduction is performed. Typically the factor is around the value of 5, or may be another factor that enables a 100–200 point's border. For example, if there were 1,000 data points, to reduce such a data set to within 100–200 points would require a factor between 5 and 10. The data set is then reduced to a set of 100–200 points.

Figure 8:
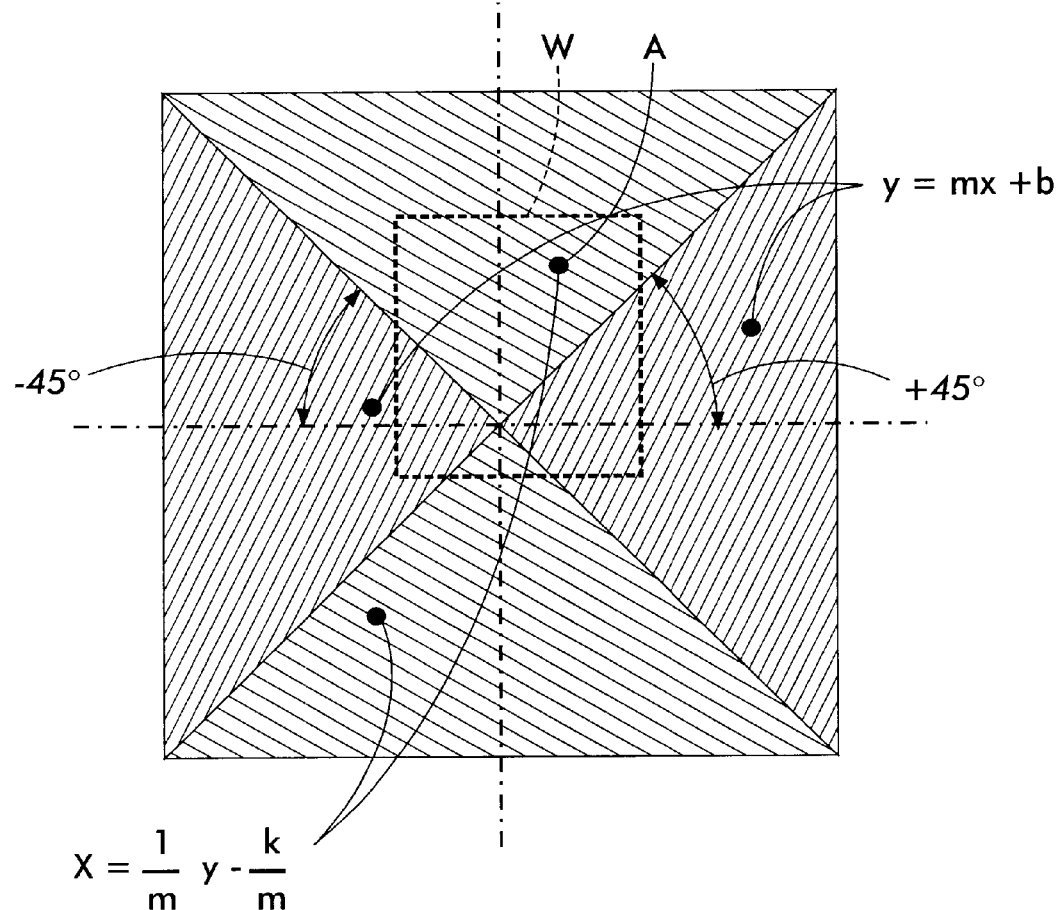
FIG. 8 is an illustration of line estimation in accordance with the present invention.

After the data reduction, at step 420 of FIG. 7, an estimation of the angle of the line passing through each remaining point on the contour is preformed. As shown in FIG. 8, a modified linear regression in a particular window (W) centered on each point is performed so as to estimate an angle of the line passing through each remaining point of the contour determined by the set of data points. Initially a modified linear regression is done on a small window centered on a point (A) where each linear regression requires a series of additions, multiplication's, and arc tangent calculations.

In particular, a standard regression algorithm fits data to the line y=mx+k. However, using a standard regression algorithm to perform these functions can lead to erratic results as the line approaches a vertical. Therefore, in the present invention, the algorithm is modified so as to account for these erratic results. As shown in FIG. 8 in each of the four quadrants indicated therein, a standard regression is used for the lines that are more horizontal in two quadrants with a slope between −45° and +45°. When the slope is not in the identified degrees, that is, when the lines are more vertical with a slope greater than 45° and in the other two quadrants, an inverted linear regression based on the inverted linear equations x=(1/m)y−(k/m) is performed. The slope angle is determined from the following equations:

|avg($xy$)−avg($x$)avg($y$)|>|avg($x^2$)−[avg($x$)]$^2$| when the slope is more vertical.

Figure 9:
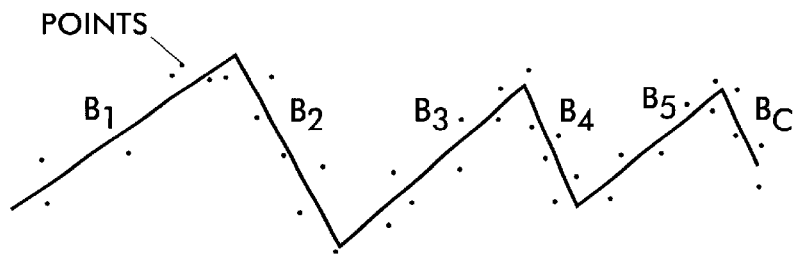
FIG. 9 is an illustration of a bin categorization in accordance with the present invention.

|avg($xy$)−avg($x$)avg($y$)|<|avg($x^2$)−[avg($x$)]$^2$| when the slope is more horizontal Once the slope calculation are accomplished, at step 430 of FIG. 7, each point associated with an angle is categorized by performing a bin categorizing operation to generate a series of bins. For example, as shown in FIG. 9, bins B1, B2, B3, and B4 . . . are generated from a series of angles, which are associated with each point. The object of step 430 is to categorize groups of adjacent boundary points that share a common slope, i.e. convert the list of boundary points into a sequence of bins (B1, B2, B3 . . . ) where each of the bins consists of a set of collinear points so as to generate a boundary of an image made up of a set of straight line segments.

When generating the above-described line segments, boundary point angles of the predecessor points may differ from the angle of the current point by a substantial amount. If, for example, the boundary point' angle differs from the previous point by less than a particular amount E, then the point is added to the current bin. If the boundary point angle differs by more than a particular amount E, then it is assigned to a new bin. Each bin (B1, B2, B3 . . . ) represents a set of collinear points along the edge.

Figure 10A:
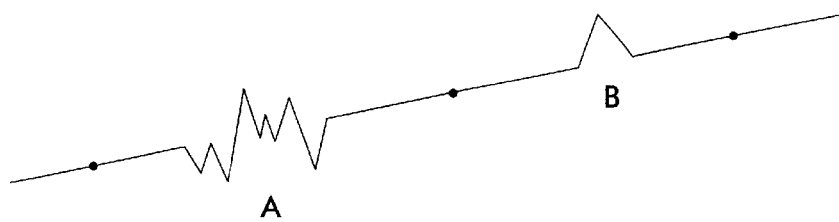
FIGS. 10A, 10B, and 10C are illustrations of a bin removal operation in accordance with the present invention.
Figure 10B:
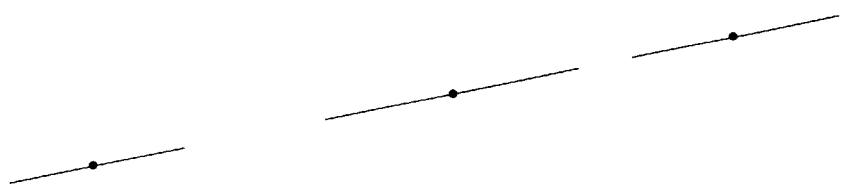
Figure 10C:
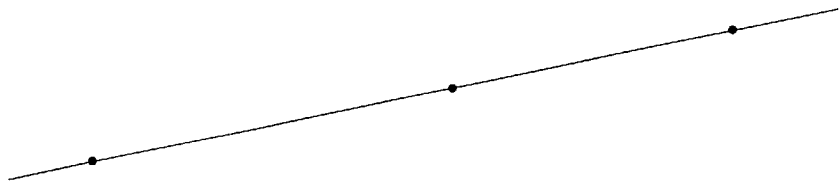

Once the bin categorization is completed and the each point is assigned with the appropriate bin some of the bins contain to few data points. Therefore at step 440 of FIG. 7 it is necessary to remove the bins which contain few or less than a minimum number of data points. Typically this removal is performed when there are approximately 5 data points. As an example of this removal in FIG. 10, the smaller bins A, B, and C are removed because they contain less than 5 data points.

After the bin removal of the smaller bins, an average angle of points within each of the remaining bins is determined at step 450. The same modified regressions described above are now applied to the remaining bins generating an average slope and average slope angle calculation for each of the remaining bins.

Figure 11:
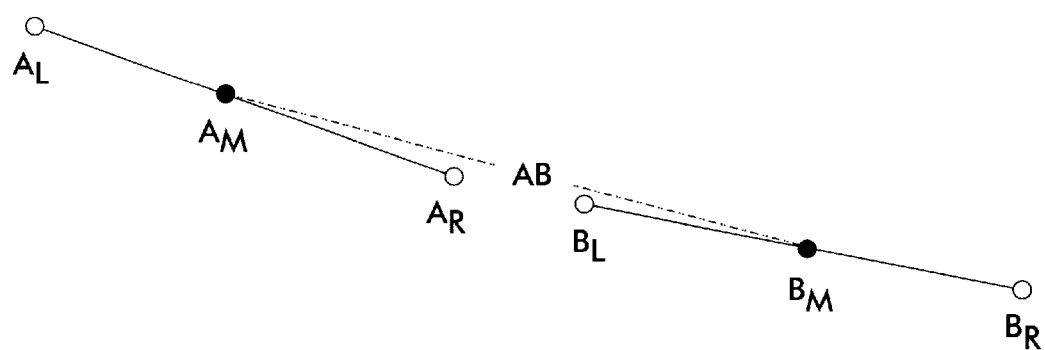
FIG. 11 is an illustration of a midpoint averaging between bins in accordance with the present invention.

Next, the remaining bins that share common angles are combined at step 460. These remaining bins were previously not adjacent to each other but became adjacent at step 440 by the removal of small bins found in between the nonadjacent bins. When these bins in between are removed, the bins that are left and that are now adjacent can sometimes be collinear. Therefore, the angle of each bin is checked and if adjacent bins are collinear, the bins are joined into a single bin at step 460. Such a procedure is illustrated in FIG. 11, were a bin defined by AL-AR and another bin defined by BL-BR are compared to each other. The midpoint between each point AM/BM is calculated and the slope of the segment AB is determined and compared to the slopes of each of the bins. If the slopes are within 10°, an amount designated as E, then the following calculation is performed.

(Slope (AB)−Slope (A))<E & (Slope(AB)−Slope(B))<E where E is approximately 10 degrees. There are instances when the slope calculations are susceptible to noise in short bins, hence the value is modified if one of the bins is determined to be very short with respect to the other bin.

Finally, at step 470, the intersection between each bin and the next bin is calculated. The midpoint x, y, and slope angle M of each bid is used to calculate the intersection xy between the two bins.

$k_1=y_1-m_1x_1$ $k_2=y_2-m_2x_2$ $x=k_2-k_1/m_1-m_2$ $y=m_1x+k_1$

The angle of intersection is calculated from the vector cross product between vectors pointing from the intersection point to the midpoints:

$A \times B=[(x1-x)(y2-y)-(x2-x)(y1-y)]k=[A][B] \sin(\theta)k\theta=\sin^{-1}\{(x1-x)(y2-y)-(x2-x)(y1-y)/$ At this stage of the procedure the edge boundary has been reduced to a small number of bins. The next step is to apply a recognition algorithm because the final number of bins usually is 4 for rectangular images. However, there are cases when there are more than 4 rectangular images and so it is necessary to apply a recognition algorithm. This results because smart platens sometimes have regions that are always easily distinguished from the background images and the boundaries of the detected images bleed into the background images. Because of the bleeding, the detected boundaries do not match the actual images in certain locations. Therefore, the boundaries fail to fit the actual image and it is necessary to apply further procedures to make the boundaries fit particular images.

Figure 12:
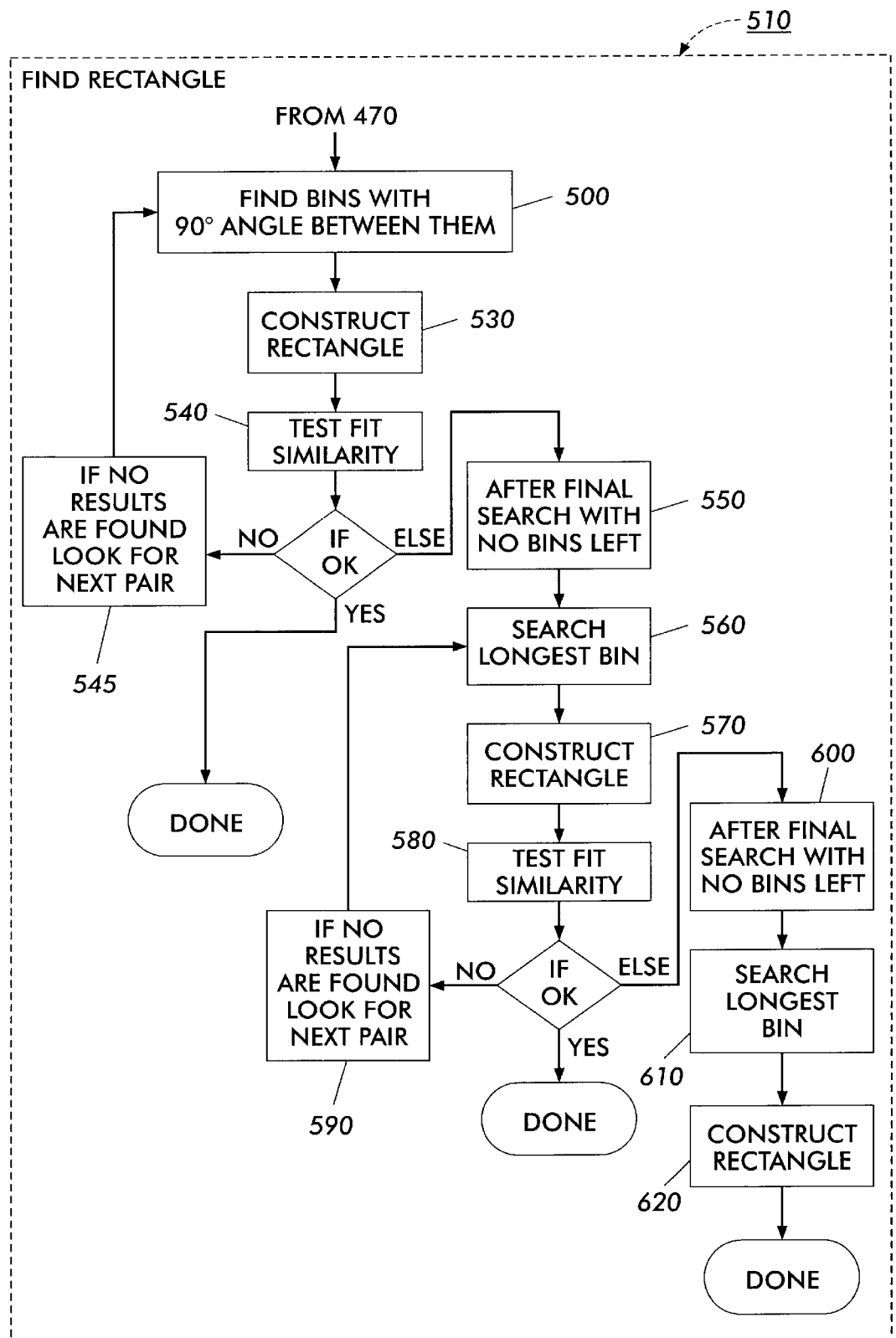
FIG. 12 is a detailed illustration of a step of the flowchart of FIG. 7 in accordance with the present invention.

At step 500 of FIG. 12, the list of bins which is generated is browsed to identify bins that have 90° intersections with neighboring bins or the bins that approximate 90° angles with their neighbors. If there are bins that are ascertained to be aligned on the edge of the platen, then these bins are overlooked because often the bins so aligned are from images misaligned against the edges of the platen. It is necessary to search for all right or 90° angles because these angles also may correspond to the corners of an image. To be considered a right angle a bin has to lie between 85–95°. As indicated earlier, in step 470 of FIG. 7 the angle of intersection is calculated and is used in step 500 to determine whether or not there are right angles.

Next, as illustrated in FIG. 12, at step 530, once the right angle is identified, the flow proceeds to determine whether a rectangle can be constructed and can be test fitted to the boundary. To construct a rectangle the following steps shown in the flow chart of FIG. 13 are performed.

Figure 13:
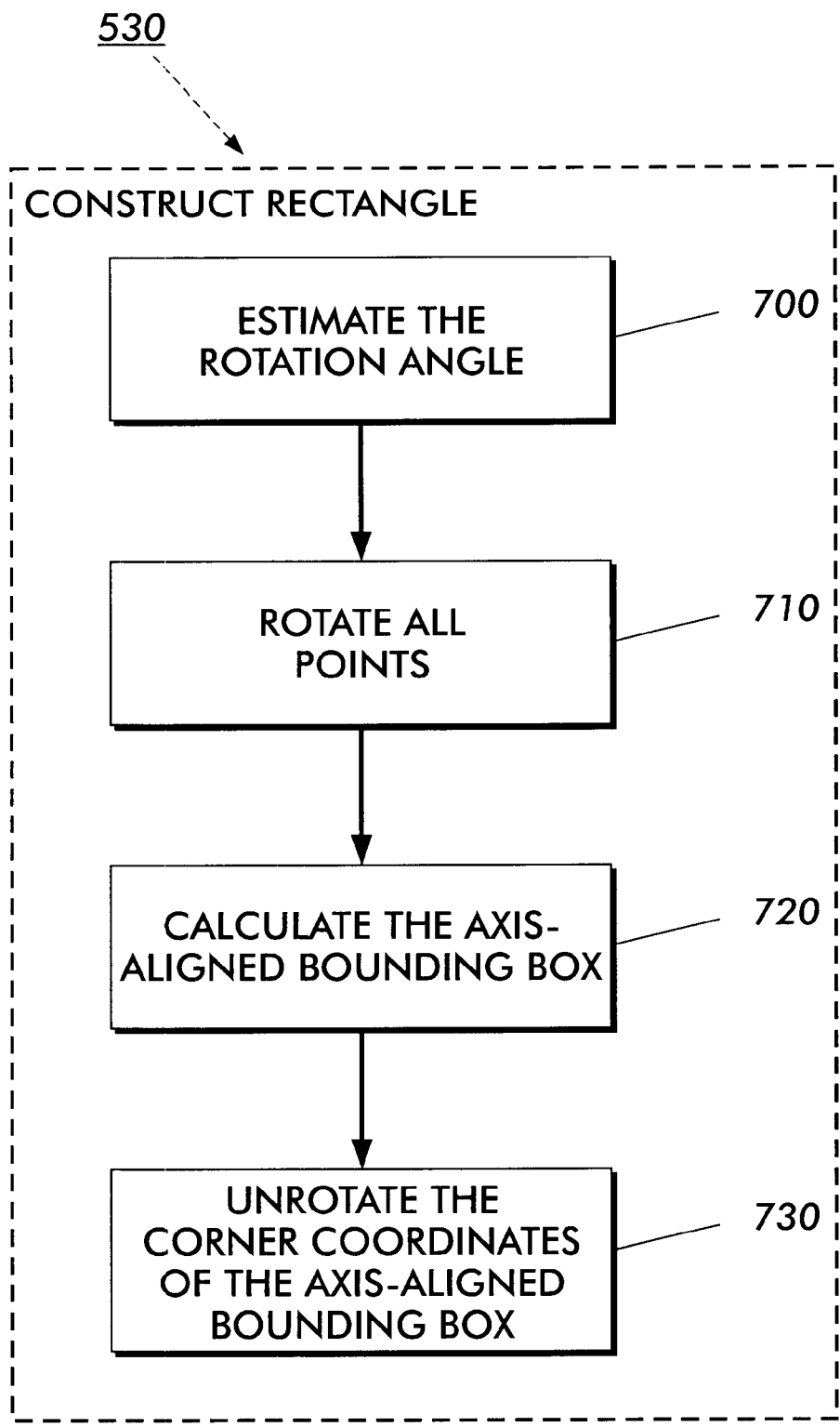
FIG. 13 is a detailed illustration of a step of the flowchart of FIG. 12 in accordance with the present invention.

At step 700 of FIG. 13, an estimation of the rotation angle of a rectangle as the slope angle of the right angle of the bin is performed. Next, at step 710 all the points on the boundary of the rectangle are rotated according to the rotation angle found in step 700. At step 720, the axis aligned bounding box is calculated. Then the corner coordinates of the axis aligned bounding box are unrotated at step 730. The flow then proceeds to step 540 of FIG. 12.

At step 540 of FIG. 12, a test of the similarity measure or similarity fit is performed by counting the number of boundary points in each of the two bins that are at right angles and that lie within a measure of 3 pixels of the resulting bounding box divided by the total number of points in the bin. If the similarity measure is less than 0.9 the rectangle test is considered to be a good match and the flow proceeds until done. If the similarity test is less than 0.9 no results are found the flow proceeds to step 500 for the next pair of bins at step 545 and is repeated for the next right angle pair of bins. If no angles have similarity then the flow proceeds to step 550 to an after final search until no bins are left.

Next, at step 560 the longest bin is searched and the flow proceeds to determine if a rectangle can be constructed to be test fitted to the boundary. In order to construct the rectangle the following steps are necessary as shown in FIG. 13. Initially, an estimation of the rotation or angle is determined at step 700, then all the points are rotated at step 710, a calculation of an axis aligned bounding box at step 720 and the corner coordinates of the axis-aligned bounding box are unrotated. The flow then proceeds to step 580. There a rectangular test fit is performed and is determined to be good if the test fit similarity measure is greater than 0.9 resulting in a good match to be determined. If the similarity measure is less than 0.9 the flow proceeds back to step 560 and is repeated again for the next longest bin. If the test fit similarity test fails again then the step proceeds to the after final search with no bins left Step 600. The flow then proceeds to Step 610 where the longest bin is searched. Then a rectangle is constructed at step 620 from the longest bin.

At this point, a bounding box has been identified along with its rotation angle. The next step is to eliminate those boundaries that are determined not to actual boundaries of the bounding box. If the aspect ratio of the bounding rectangle is more than 15:1 or less than 0.075:1 then a boundary is considered not to be conforming as a boundary of the bounding box and is rejected. Also, if the actual width or height is less than 5 pixels; the boundary is again considered not to be desirable and is rejected.

Finally, it is possible that a single image may show up as two or more boundaries if the bleeding is excessive. In this case, a containment algorithm is applied to test if a boundary is contained within another. Each boundary is tested against all other boundaries to see if there is a 25% or more overlap between the two boundaries. If such an overlap occurs, the two boundaries are joined and the bounding rectangle is recalculated (go to step 500).

Figure 14:
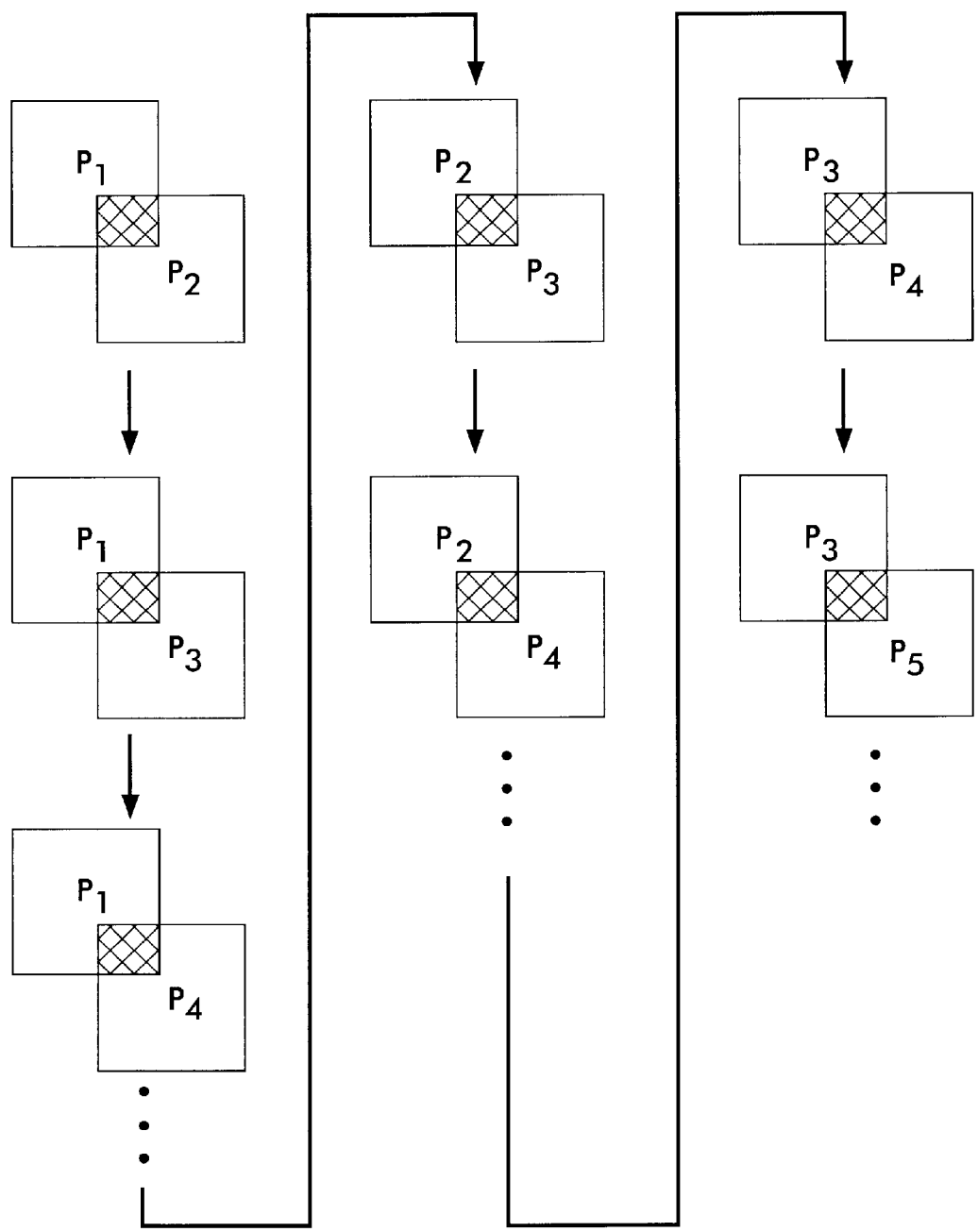
FIG. 14 is an illustration of an overlap detection of images in accordance with the present invention.

The points that make up a boundary are generally the verticals of a many-sided polygon. The containment test as shown in FIG. 14, is a procedure to calculate the overlap between two polygons P1 and P2.

Figure 15:
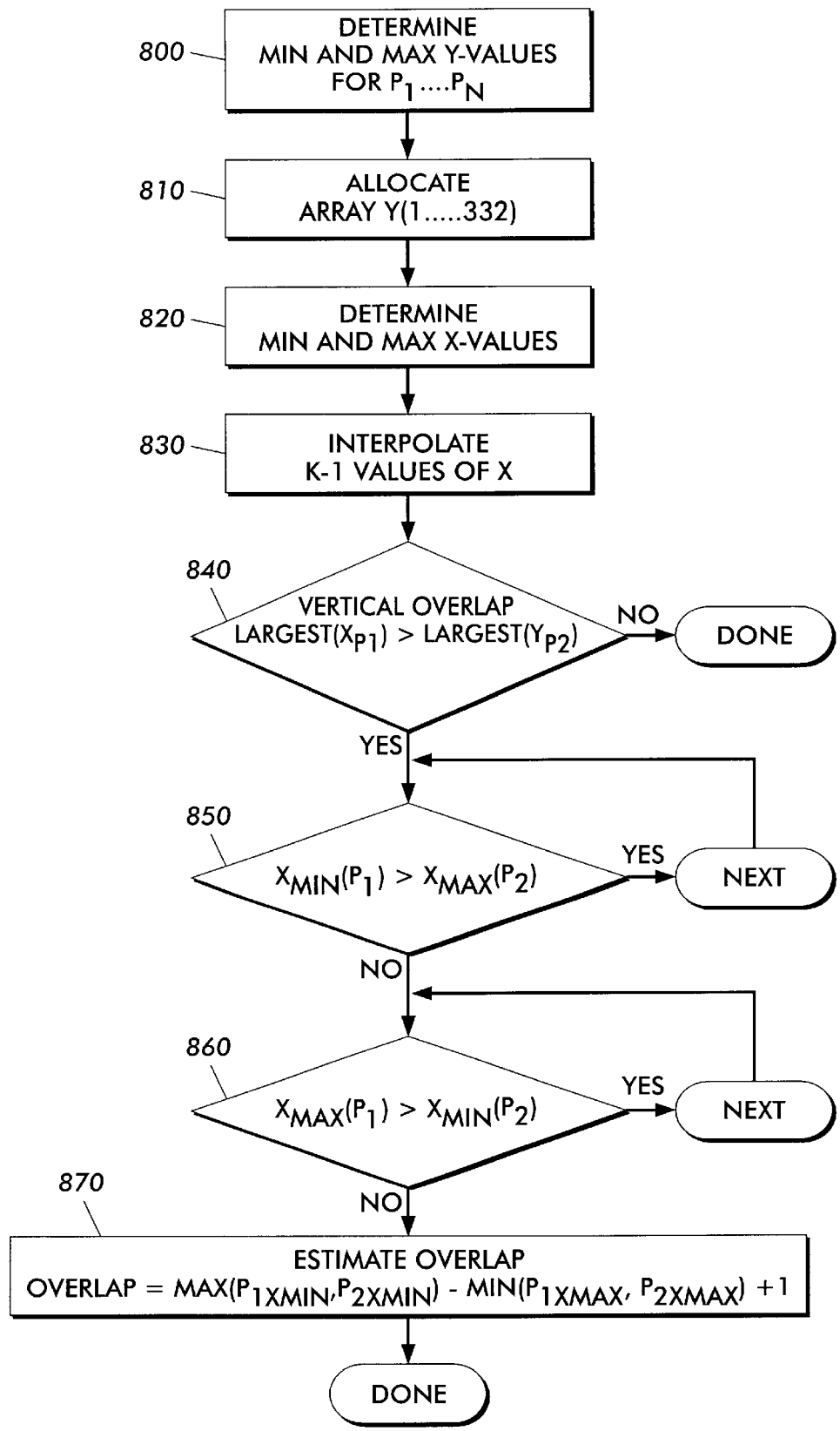
FIG. 15 is a flowchart of the overlap detection shown on FIG. 14.

Initially, as shown in FIG. 15, a determination of the minimum and maximum P1 & P2 y-values (step 800) for each polygon is performed. In the case of Smart Platen, these values are already known and do not have to be recalculated. Next, for each polygon, there is an allocation of an array large enough to store two integers for all possible values of y in the polygon (step 810). For example, if y were to have a range of 332, then it is necessary to allocate an array of 332 pointers to two integers. Third, for each polygon, X values are determined by scanning through the vertices and determining the min and max values of X for each Y-value (step 820). However, vertices may not exist for each y-value, therefore Y-values may have to be interpolated. As an example, consider two vertices given by (x1,y1) and (x2,y2) where y2−y1=K. It is necessary to interpolate K-1 values of X, one for each value of y. The algorithm for interpolating x is as follows:

```
(Step 830)
dx = (x2-x1) / K;
for (j=0; j<K; ++j)
{
x = x1 + j*dx;
...
}
```

Once the arrays containing the min and max x-values for each polygon is created at step 810, an overlap measurement determination is performed at step 840.

The test for vertical overlap is if the least y-value is greater than the largest y-value step 840, there is no overlap and then the flow proceeds to step 880. Also, if the largest y-value of P, is less than the least Y-value of P2, then there is no overlap, the flow proceeds to step 800. However, for those y-values where both P1 and P2 overlap, the horizontal overlap is summed and the following checks are performed. First, if the minimum x-value of P1 is greater than the maximum x-value of P2 then the flow proceeds to step 860. Second, if the maximum x-value of P1 is less than the minimum x-value of P2, then the flow proceeds to step 870 and an estimation of the overlap for that y-value is performed as follows:

Overlap+=Maximum $P1_{xmin}$, $P2_{xmin}$)−Minimum ($P1_{xmax}$, $P2_{xmax}$)+ 1(step 870)

This determination shown above returns the overlap between two polygons. When applied to the inventions platen, we normalize the returned overlap area by dividing by the smaller of the two borders. If the result exceeds 25%, the smaller boundary is considered to be an orphan or a part of the larger boundary and the two are merged and a new bounding rectangle is calculated.

By performing the above steps a good bounding rectangle is identified. Further techniques such as file extraction are also applicable to further process the received data. Other kinds of processing steps may also be performed for detecting non-rectangular objects, overlapping rectangular objects, etc.

While the invention is described with reference to a particular embodiment, this particular embodiment is intended to be illustrative, not limiting. Various modifications may be made without departing from the spirit and scope of the invention as defined in the amended claims. Modifications and alterations will occur to others upon reading and understanding this specification, therefore it is intended that all such modifications and alterations are included insofar as they come within the scope of the appended claims or equivalents thereof.

What is claimed is:

1. A method for processing a digital image using an imaging input device so as to reduce bleeding of the edges of the detected images comprising the steps of:

receiving a digitized image including at least one of a plurality of representations of objects;

processing said digitized image into at least one of a plurality of images of said digitized image wherein said processing step includes defining a plurality of bins having a plurality of edge points making up each of said plurality of images of said digitized image; and, reducing the plurality of edge points that make up each of the plurality of bins by dividing said plurality of edge points by a factor of N.

2. The method according to claim 1, comprising:

wherein said processing step including estimating an angle of a line passing through each of said edge points.

3. The method according to claim 2, comprising:

said estimating including using standard linear regressions for generating lines from said edge points of each bin in a horizontal direction, and using an inverted linear regression for generating lines from said edge points of each bin in a vertical direction.

4. The method according to claim 3, further comprising the step of: grouping the set of generated lines of each bin that approximate similar characteristics.

5. The method according to claim 3, further comprising the step of: removing lines generated by bins that are less that a minimum number of points.

6. The method according to claim 5, further comprising the step of: joining adjacent bins having collinear lines.

7. The method according to claim 5, further comprising: wherein the step of joining said bins includes determining whether the midpoints of adjacent bins are collinear.

8. The method according to claim 7, further comprising: calculating the intersection between each bin.

9. A method for processing a digital image using an imaging input device reducing bleeding of the edges of the detected images by determining edge contours to generate bounding boxes comprising:
identifying bins having edges that approximate 90 degrees, and modeling a rectangular image fitting for bins that approximate the 90 degrees edges said modeling further comprising:
estimating the rotation angle of a rectangle as the slope of right angles,
rotating all points of a boundary by a rotation angle,
calculating the bounding boxes of the rotated boundary points,
calculating a similarity measure by counting the number of boundary points, and
unrotating the corner coordinates of the axis-aligned bounding boxes.

10. The method according to claim 9, comprising:
measuring if similarity is less than a desired amount then determining the rectangular image fitting to be a good match.

11. The method according to claim 9, comprising:
measuring if the similarity is greater than a desired amount then determining the rectangular image fitting not to be a good match.

12. The method according to claim 9, comprising:
determining the longest bin,
estimating a rotation angle being the slope of the longest bin,
calculating the axis-aligned bounding box of the rotated boundary points, and
calculating a similarity measure of the longest bin.

13. The method according claim 9, comprising
determining the longest bin,
estimating a rotation angle of said longest bin,
rotating the points on the boundaries by said rotation angle,
calculating the bounding box of the rotated points, and
unrotating the coordinates of the bounding box by a negative rotation angle.

14. The method according claim 13, further comprising eliminating boundaries that have an aspect ration more than 15:1, or height and width less than 5 pixels.

15. A method for processing a digital image comprising the steps of:
receiving a digitized image of a plurality of representations of objects;
processing said digitized image into a plurality of images representing said digitized image wherein said processing step includes generating a plurality of bins wherein said bins have a plurality of edge points making up the boundaries of each of said plurality of images of said digitized image; and,
reducing the plurality of edge points of each bin by dividing a set of edge points of a particular bin by a factor of N.

16. The method according to claim 15, comprising:
wherein said processing step including estimating an angle of a line passing through each of said edge points.

17. The method according to claim 16, comprising:
said estimating step is performed either by using standard linear regressions for generating lines from said edge points of each bin in a horizontal direction, or
using an inverted linear regression for generating lines from said edge points of each bin in a vertical direction.

18. The method according to claim 17, further comprising the step of:
grouping the set of generated lines of each bin that approximate similar characteristics.

19. The method according to claim 1, further comprising the step of:
removing lines generated by bins that are less that a minimum number of points.

20. The method according to claim 1, further comprising the step of:
joining adjacent bins having collinear lines into one bin.

21. The method according to claim 1, further comprising:
wherein the step of joining said bins includes determining whether the midpoints of adjacent bins are approximately collinear.

22. The method according to claim 1, further comprising: calculating the intersection between each bin.

23. A method for processing a digital image using an imaging input device reducing bleeding of the edges of the detected images by determining edge contours to generate bounding boxes comprising:
identifying bins on said edge contours having edges that approximate 90 degrees; and,
modeling a rectangular image for each of the identified bins, said modeling step further comprising:
estimating a rotation angle of a rectangle as the slope of right angles;
rotating all points of a boundary by said rotation angle;
calculating the bounding box of the rotated boundary points;
calculating a similarity measure by counting the number of boundary points; and,
unrotating the corner coordinates of the bounding box.

24. The method according to claim 23, comprising:
measuring if similarity is less than a desired amount then determining the rectangular fit to be a good match.

25. The method according to claim 24, comprising:
measuring if the similarity is greater than a desired amount then determining that the fit is not a good match.

26. The method according to claim 23, comprising:
determining the longest bin,
estimating a rotation angle being the slope of the longest bin,
calculating the bounding box of the rotated boundary points, and
calculating a similarity measure of the longest bin.

27. The method according claim 23, comprising
determining the longest bin,
estimating a rotation angle of said longest bin,
rotating the points on the boundaries by a rotation angle,
calculating the bounding box of the rotated points, and
unrotating the coordinates of the bounding box by a negative rotation angle.

28. The method according claim 27, further comprising eliminating boundaries that have an aspect ratio more than 15:1, or height and width less than 5 pixels.

* * * * *